(12) United States Patent
Prior

(10) Patent No.: US 8,382,978 B2
(45) Date of Patent: Feb. 26, 2013

(54) DEVICE AND METHOD FOR CLEANING UP SPILLED OIL AND OTHER LIQUIDS

(76) Inventor: David L. Prior, Halifax (CA)

( * ) Notice: Subject to any disclaimer, the term of this patent is extended or adjusted under 35 U.S.C. 154(b) by 307 days.

(21) Appl. No.: 12/863,124

(22) PCT Filed: Dec. 23, 2008

(86) PCT No.: PCT/CA2008/002288
§ 371 (c)(1),
(2), (4) Date: Jul. 15, 2010

(87) PCT Pub. No.: WO2009/092154
PCT Pub. Date: Jul. 30, 2009

(65) Prior Publication Data
US 2010/0314329 A1   Dec. 16, 2010

(30) Foreign Application Priority Data
Jan. 21, 2008   (CA) ...................... 2618248

(51) Int. Cl.
  *E02B 15/04* (2006.01)
(52) U.S. Cl. ................ 210/170.11; 210/242.3; 210/540; 210/923
(58) Field of Classification Search ............... 210/747.5, 210/776, 170.11, 175, 187, 221.2, 242.3, 210/538, 540, 923
See application file for complete search history.

(56) References Cited

U.S. PATENT DOCUMENTS

| | | | |
|---|---|---|---|
| 3,615,017 A | | 10/1971 | Valdespino |
| 3,760,944 A | * | 9/1973 | Bell et al. ...................... 210/776 |
| 3,762,548 A | * | 10/1973 | McCabe ................. 210/170.11 |
| 4,008,156 A | * | 2/1977 | Chastan-Bagnis ............ 210/923 |
| 4,191,650 A | * | 3/1980 | Muneta ....................... 210/242.3 |
| 4,265,757 A | * | 5/1981 | Ivanoff ....................... 210/242.3 |
| 4,554,074 A | * | 11/1985 | Broughton .................... 210/540 |
| 4,921,605 A | * | 5/1990 | Chastan-Bagnis et al. ......................... 210/242.3 |

(Continued)

FOREIGN PATENT DOCUMENTS

| | | |
|---|---|---|
| CA | 1071470 | 2/1980 |
| CA | 1241607 | 9/1988 |

(Continued)

OTHER PUBLICATIONS

CA, Third Party Submission, Canadian Patent Application No. 2,618,248 (Aug. 9, 2011).

(Continued)

*Primary Examiner* — Christopher Upton
(74) *Attorney, Agent, or Firm* — Thompson Hine L.L.P.

(57) ABSTRACT

A device and method for cleaning up spilled oil and other liquids that are relatively less dense than water, that have spilled on the water or are borne on water or an other relatively dense liquid, and for separating oil and other liquids that are relatively less dense than water, from water or an other relatively dense liquids including an oil/water separation column having a lower end forming a bottom opening oriented substantially parallel to the surface of the body of water in fluid communication with the water and spilled oil, an air pump in airtight engagement with, and proximate the upper end of the oil/water separation column and adapted to draw water and the spilled oil into the oil/water separation column; and an oil pump in liquid tight engagement with and proximate the upper end of the oil/water separation column and adapted to draw the spilled oil from the oil/water separation column.

17 Claims, 7 Drawing Sheets

U.S. PATENT DOCUMENTS 6,159,361 A * 12/2000 Lapointe .................. 210/242.3
7,452,462 B2 * 11/2008 Joliet ....................... 210/242.3

FOREIGN PATENT DOCUMENTS

| CA | 2154565 | 8/1994 |
| CA | 2419145 | 2/2002 |
| JP | 4-197486 | 7/1992 |

OTHER PUBLICATIONS

"Bunkerworld Forums—Letters to the Editor—Oil spill technology outdated," http://www.bunkerworld.com/forum/letters/87359/Oil-spill-technology-outdated (Aug. 3, 2009).

Sayles, K., "Innovative Oil Clean Up Invention Receiving International Recognition," http://smartauthor.com (Jun. 18, 2004).

"Oil Spill Technology Miracle Patent: Hijacked," http://www.free-press-release.com/news-oil-spill-technology-miracle-patent-hyjacked-1293438207 . . . (Dec. 27, 2010).

"Innovative Oil Clean Up Invention by a Chemical Engineering Professor Works—Receiving International Recognition," http://www.prweb.com/releases/2004/05/prweb126633.htm (May 17, 2004).

Graham-Rowe, D., "A slicker way to clean up oil tanker spills," *New Scientist Magazine*, Issue 2385 (Mar. 8, 2003).

Ghannam, M.T. et al., "Oil spill cleanup using vacuum technique," *Fuel*, 82, pp. 789-797 (2003).

PCT, International Preliminary Report on Patentability, International Application No. PCT/CA2008/002288 (Jul. 27, 2010).

International Search Report, Feb. 23, 2009—PCT/CA2008/002288.

* cited by examiner

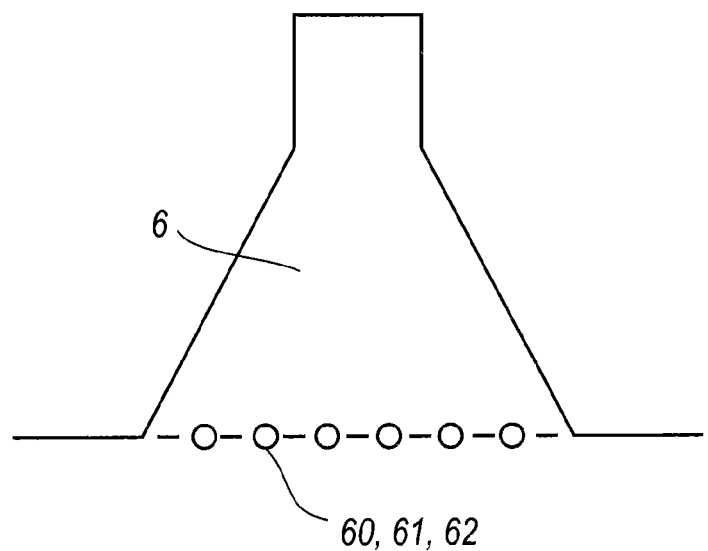
FIG. 8A
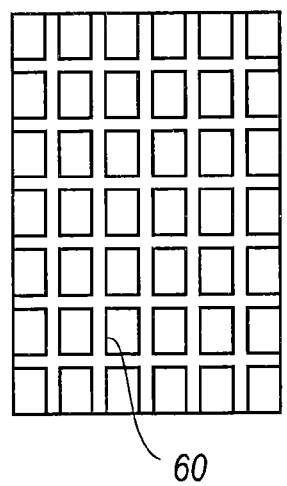 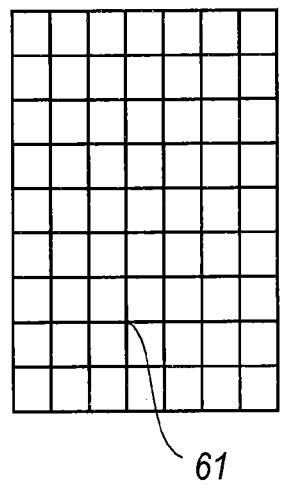 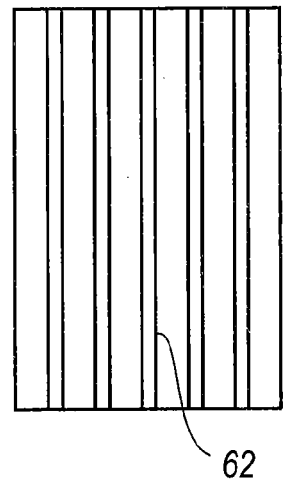
FIG. 8B  FIG. 8C  FIG. 8D

DEVICE AND METHOD FOR CLEANING UP SPILLED OIL AND OTHER LIQUIDS

This application is the national stage filing of PCT International Application No. PCT/CA2008/002288, which in turns claims priority to Canadian Application No. 2,618,248, filed on Jan. 21, 2008. The entire contents of both of these applications are incorporated herein by reference.

FIELD OF THE INVENTION

The present invention relates to a device and method for cleaning up spilled oil and other liquids, and more particularly, relates to a device and method for cleaning up oil and other liquids that are relatively less dense than water, that have spilled on the water or are borne on water or an other relatively dense liquid, and for separating oil and other liquids that are relatively less dense than water, from water or an other relatively dense liquids.

BACKGROUND OF THE INVENTION

The clean up of, for example, spilled oil (in the context of the description and claims provided herein, oil may be understood to mean crude oil, bunker C fuel oil, diesel fuel, jet fuel, gasoline, kerosene, vegetable and/or corn oil, and other liquids known to a person skilled in the art, all of which are hereinafter referred to as "oil" in the present description and for the purposes of the description and claims provided herein, the word "oil" is used herein to refer to each of these substances, unless specifically indicated otherwise) from fresh water, or sea water is an important issue in the context of the modern offshore oil drilling and exploration operations, oil rig operations and oil transportation, storage and handling activities, including the transportation of oil in oil tankers, shipping vessels, oil tank cars, oil tank trailers, oil pipelines and oil tanks which travel by way of, or travel over, or are proximate to fresh water or sea water. The spillage of oil on water may result in a very hazardous circumstance, and may result in a very serious environmental and ecological disaster. In order to minimize the effect of a spill, it is desirous to clean up the oil as quickly and thoroughly as possible.

It is desirable to provide a device and method which may be utilized to quickly and thoroughly clean up an oil spill, and which may be readily transported from one location to another as needed.

SUMMARY OF THE INVENTION

Accordingly, one object of the present invention is to provide a device and method which may be utilized to quickly and thoroughly clean up an oil spill, and which may be readily transported from one location to another as needed.

Accordingly, another object of the present invention is to provide a device and method which may be utilized to separate a more buoyant liquid from a less buoyant liquid.

According to one aspect of the present invention, there is provided a device for cleaning up spilled oil from the surface of a body of water, comprising, a vessel adapted to float on the water and to pass over the spilled oil, an oil/water separation column supported by the vessel, and having a lower end in fluid communication with the water and spilled oil, and having an upper end, an air pump in airtight engagement with, and proximate the upper end of the oil/water separation column and adapted to draw oil and water into the oil/water separation column and a oil pump in liquid tight engagement with and proximate the upper end of the oil/water separation column and adapted to draw oil from the oil/water separation column, wherein as the vessel passes over the spilled oil and water, the air pump draws spilled oil and water into the oil/water separation column, the spilled oil thereafter rising in the oil/water separation column to a position proximate the upper end of the oil/water separation column for removal therefrom by the oil pump.

The advantage of the present invention is that it provides a device and method which may be utilized to quickly and thoroughly clean up an oil spill, and which may be readily transported from one location to another as needed.

Another advantage of the present invention is that it provides a device and method which may be utilized to separate a more buoyant liquid from a less buoyant liquid.

BRIEF DESCRIPTION OF THE DRAWINGS

A preferred embodiment of the present invention is described below with reference to the accompanying drawings, in which:

FIG. 8A is a cross-sectional view of an oil/water separation column of one embodiment of the present invention having grating, netting, or series of spaced rails positioned across the bottom opening thereof; and FIGS. 8B to 8D are bottom views of the oil/water separation column shown in FIG. 8A having grating, netting, or series of spaced rails positioned across the bottom opening thereof, respectively.

DESCRIPTION OF THE PREFERRED EMBODIMENT

Figure 1A:
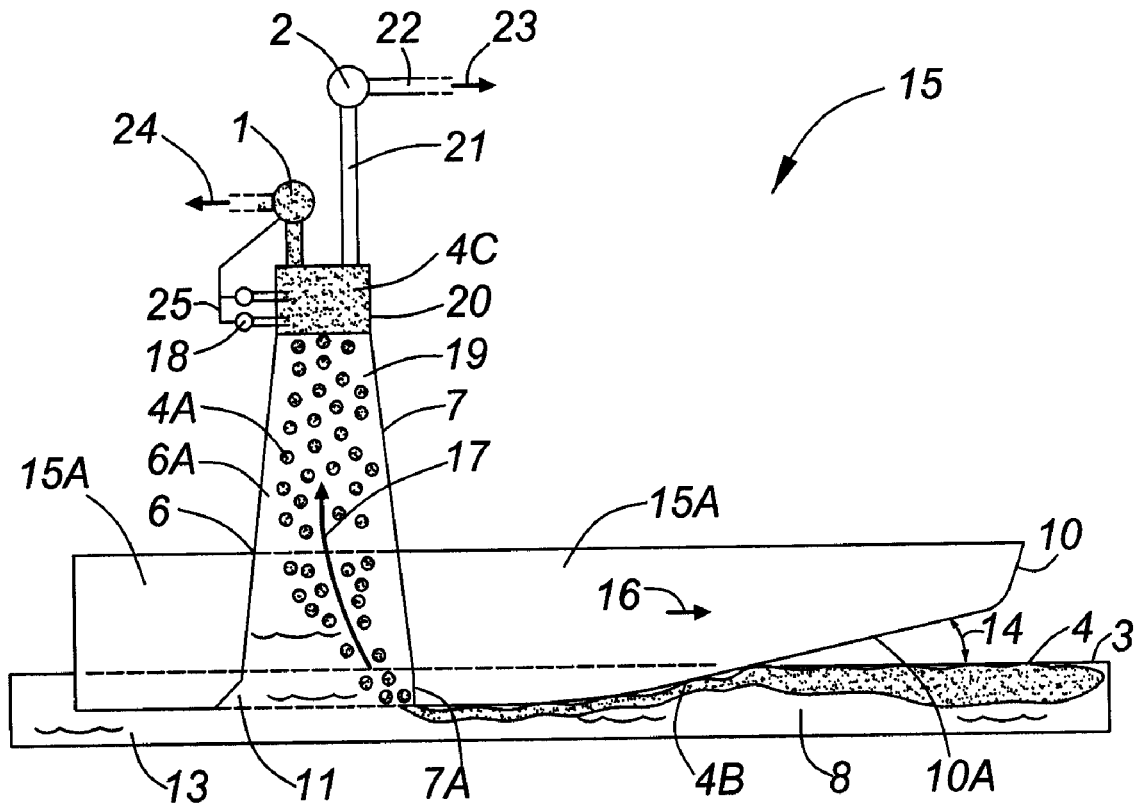
FIG. 1A is a schematic cross-sectional view of one embodiment of a portion of the present invention.

In a preferred embodiment of the present invention, as illustrated in FIG. 1A a vessel (generally shown as 15) is provided, which may be self-propelled (motor not shown) or towable through the water 8 in a generally forward direction as indicated by the arrow 16, through oil 4 which has been spilled onto the water 8.

In a preferred embodiment of the present invention, the vessel 15 has a hull 15A which is preferably made of aluminum or fibreglass or steel or a combination of these (it being understood that it may also include or be made of wood or plastic or other suitable materials known to a person skilled in the art), the hull 15A having a bow 10 which, at, and immediately above and below the water line 3, preferably has a gently inclined bow surface 10A (preferably the angle of inclination 14 of this gently inclined bow surface 10A being between zero and 20.degree. above the horizontal) so that as the vessel 15 travels forwardly in the direction as indicated by the arrow 16, the oil 4 is gently directed downwardly along the inclined surface 10A to a position 4B beneath the vessel, and thereafter as the vessel continues to travel in a forwardly direction, the oil continues to pass beneath the vessel until it passes the leading edge 7A of an oil/water separation column 6.

In the preferred embodiment of the present invention, the oil/water separation column 6 has smooth, opposed and preferably substantially vertical walls 7, or walls angled upwardly and inwardly to narrow the oil/water separation column as the height of the column increases as illustrated in FIGS. 1A, 1D, 3, 4, 5, 6 and 7, the walls 7 preferably being angled at between 45° and 85° above horizontal (it being understood that a wider range of wall angles may be utilized depending for example on the viscosity or other characteristics of the oil or other liquid as would be understood by a person skilled in the art, for example, walls angled upwardly at for example less than 45° above horizontal may be utilized to separate kerosene or gasoline from water), the water 6A being drawn into (as indicated by the arrow 17) the oil/water separation column 6 as a result of a partial vacuum or low pressure area created in the oil/water separation column 6, by means of, for example, a continuously operating high speed blower vacuum pump 2 preferably directly connected at or proximate to the top of the oil accumulation chamber 20 (as more fully described herein), or by means of, for example, a short length of pipe 21 as illustrated in FIG. 1A, the vacuum pump 2 expelling air from the oil accumulation chamber 20 to the atmosphere as indicated by the arrow 23 (it being understood that the vacuum pump 2, by providing a partial vacuum or low pressure area within the oil/water separation column 6 results in a column of water forming within the oil/water separation column 6, and as the oil passes beneath the vessel, by reason of the oil's natural buoyancy relative to the water, upon passing beneath the oil/water separation column 6, the oil rises, as indicated by the arrow 17 into the column of water within the oil/water separation column 6).

Within the oil/water separation column 6, the relatively buoyant (less dense) oil 4A accumulates (as shown at 4C) at or substantially proximate the top of the oil/water separation column 6 in the oil accumulation chamber 20. The separated oil may thereafter be pumped from the oil accumulation chamber 20 by way of an oil pump 1, and thereafter into (as illustrated by the arrow 24), for example, one or more portable onboard storage tanks (not shown), storage bags (not shown), or other suitable storage facility, or at a location remote from the vessel.

In one embodiment of the present invention, one or more oil sensors 18 are preferably provided on or within the oil accumulation chamber 20 (to detect the presence of oil within the oil accumulation chamber 20) and are preferably electronically or otherwise connected 25 to the oil pump 1, which one or more oil sensors 18, when sensing the presence of oil in the oil accumulation chamber 20, preferably electronically activates the oil pump 1 so that when a volume of separated oil is positioned at or substantially proximate the top of the oil accumulation chamber 20, the oil pump is activated by the one or more oil sensors 18 and the separated oil thereafter removed from the oil accumulation chamber 20 for storage (the oil sensors 18 preferably deactivating the pump if significant quantities of water, or the absence of oil, is detected).

As the vessel continues to move in a forwardly direction, it continues to pass over the water 13 that has passed beneath the oil/water separation column 6 (from which water the oil has been fully or partially removed as described above), and thereafter, as the vessel continues to move in a forwardly direction, this treated water passes beneath the vessel until the vessel's stern 50 has passed it over, and in so doing has completed the full or partial separation of the oil from the water (it being understood that in the event that incomplete separation has occurred, the vessel may pass over the water on more than one occasion to achieve the desired level of separation).

Figure 1B:
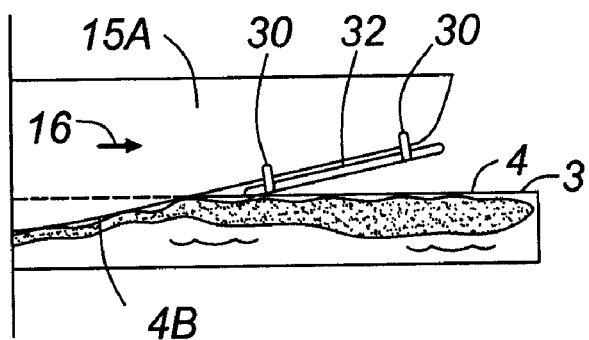
FIG. 1B is a schematic cross-sectional view of the bow of a vessel of one embodiment of the present invention with a heated surface attached thereto.
Figure 1C:
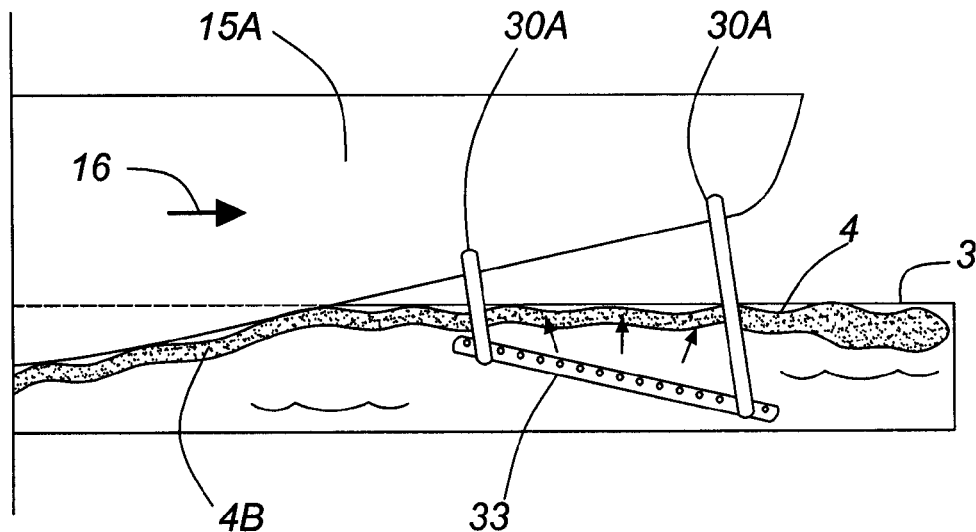
FIG. 1C is a schematic cross-sectional view of the bow of a vessel of one embodiment of the present invention with a hollow panel attached thereto adapted to release air or other gas bubbles into the water beneath the oil.
Figure 1D:
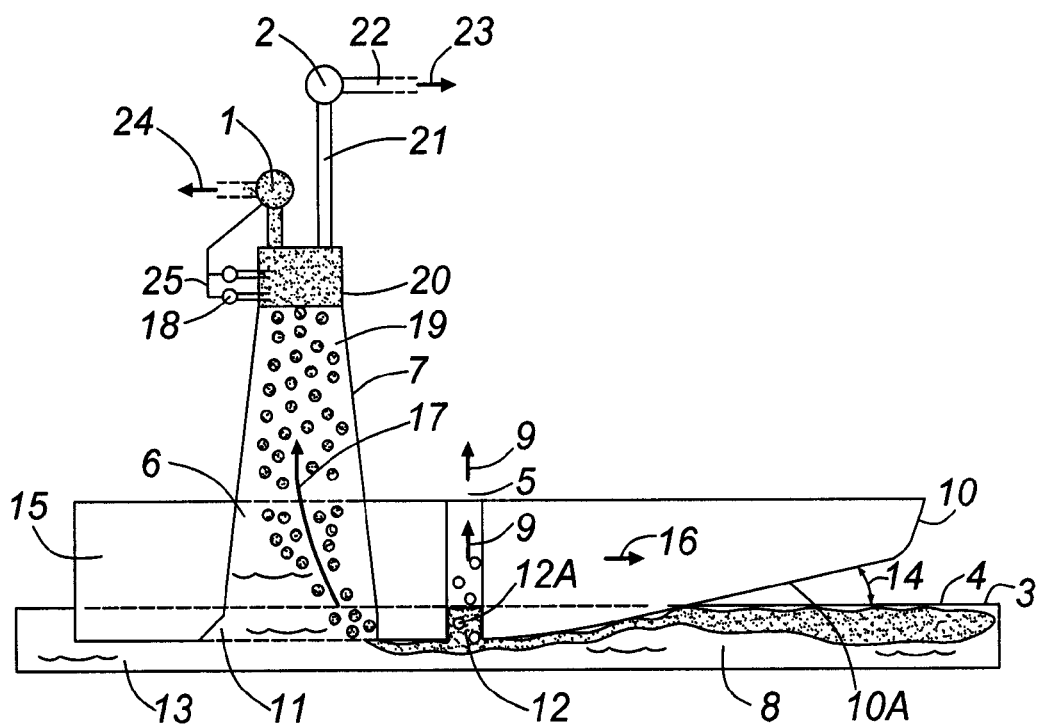
FIG. 1D is a schematic cross-sectional view of a vessel of one embodiment of a portion of the present invention with an air bubble release passageway therein.

In one embodiment of the invention, as illustrated in FIGS. 1A and 1D, the lower end of the aft wall of the oil/water separation column, has an inclined surface 11 (inclined toward the stern of the vessel) as it meets the bottom of the hull, to reduce turbulence as the water passes from beneath the oil/water separation column to a position beneath the hull aft of the oil/water separation column as the vessel moves in a forwardly direction. The inclined surface directs the flow of water downwardly and beneath the hull of the boat to reduce turbulence within the oil/water separation column 6 to thereby enhance the separation of oil from water within the oil/water separation column 6. It is understood that while the inclined surface 11 may be flat as illustrated in FIG. 1, it can alternatively be gently curved outwardly to further reduce turbulence within the oil/water separation column 6. Furthermore, in a alternative embodiment of the present invention, a vertically oriented surface 11 may be utilized, or further alternatively a surface which is angled aftwardly may be used, or further alternatively, a surface angled slightly forwardly may be used (for example, up to 15° forward from the vertical, to form a small scoop).

In one embodiment of the invention, as illustrated in FIG. 1D, an air bubble release passageway 5 is provided in the hull of the vessel and which passageway has an opening 12 at the bottom thereof which allows air bubbles 12A to pass from beneath the hull of the vessel, through the opening 12, up through the passageway 5 to escape (as illustrated by the arrows 9) to the atmosphere as the vessel passes over the spilled oil/water, which passageway 5 reduces the amount of air flowing into and accumulating in the oil/water separation column and the oil accumulation chamber 20.

As illustrated in FIG. 1B, in one embodiment of the present invention, a heating surface 32 is securely attached by way of brackets 30 or other suitable means, to, and positioned substantially parallel with, the downwardly inclined surface 10A of the hull of the vessel, so that as the vessel and heating surface 32 comes into contact with the oil on the surface of the water, the oil is heated to thereby decrease the viscosity and density of the oil, and to increase its slipperiness, to thereby aid in the movement of the oil beneath the vessel, and to increase the separability of the oil from the water as the oil/water enters the oil/water separation column 6. In one embodiment of the present invention, the heating surface 32 may be replaced by a radio frequency emitter (not shown) to heat the oil or a device (not shown) which may spray hot water or steam onto the approaching oil floating on the body of water.

As illustrated in FIG. 1C, in one embodiment of the invention, a hollow panel 33 having an array of holes therein (or a length of perforated tubing) through which steam, air or another buoyant gas (hereinafter the steam, air or other buoyant gas is referred to herein as "air") may be blown, is securely attached by way of brackets 30A or other suitable means, to the hull of the vessel, so that as the air enters the water and forms bubbles therein which rise to the surface of the water and come into contact with the oil and temporarily adhere thereto, resulting in increased buoyancy of the oil. In one embodiment of the present invention, the air is heated, so that as it rises and comes into contact with the oil, the heated air decreases the viscosity and density of the oil, and increases its slipperiness, to thereby aid in the movement of the oil beneath the vessel, and to increase the separability of the oil from the water as the oil/water enters the oil/water separation column 6. In an alternative embodiment of the present invention, a length of perforated tubing through which preferably heated air may be blown is securely attached to the hull and arranged so that the air may come into contact with the oil prior to or as the oil passes beneath the oil/water separation column 6. In an alternative embodiment of the present invention, a propeller (not shown) may be positioned in secure engagement with, or instead of, the hollow panel 33, the propeller being positioned so that it provides upwardly directed thrust, thereby directing oil toward the surface of the water, and, in the case where the oil is trapped beneath floating ice, agitating the water proximate the trapped oil to wash the trapped oil from beneath the ice so that the trapped oil moves to the edge of the ice where it can, by reason of its relative buoyancy, rise to the surface of the water for separation by the vessel in the manner described herein.

Figure 3:
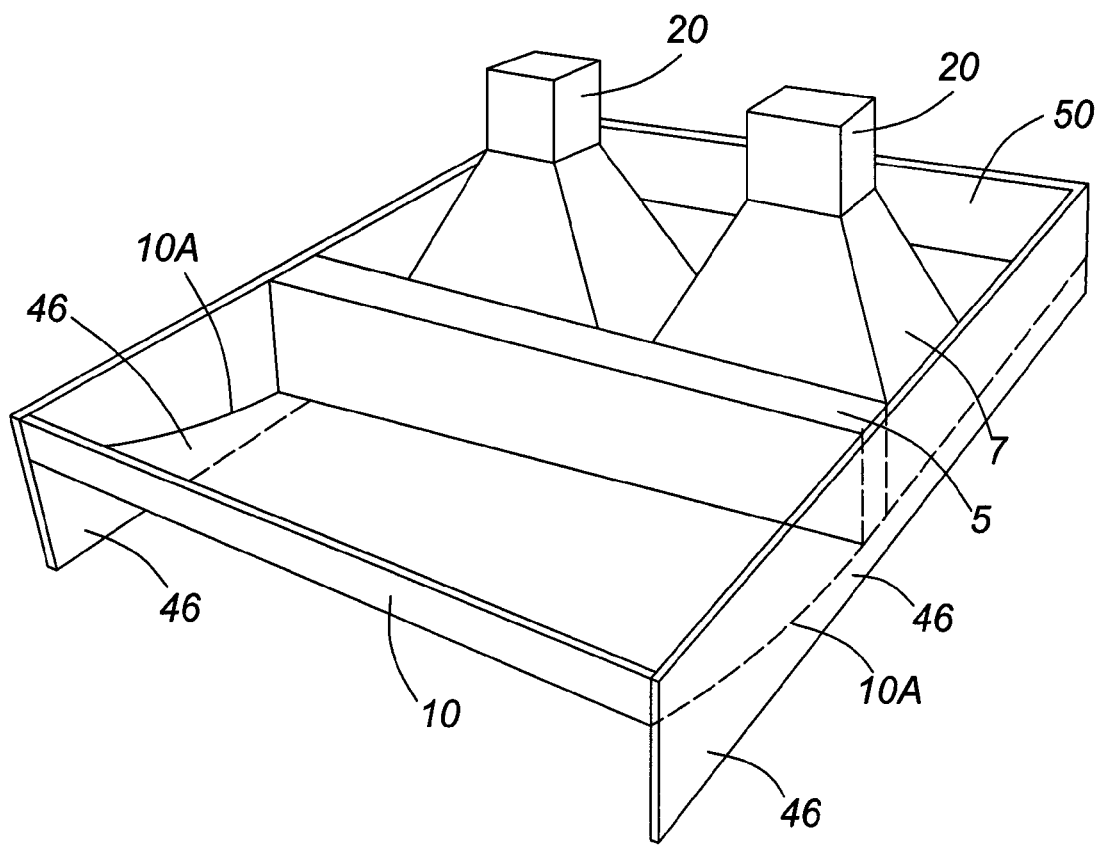
FIG. 3 is a perspective view of the hull and main structure of a vessel of one embodiment of the present invention.

As illustrated in FIG. 3, in one embodiment of the present invention, fins 46 may extend downwardly beyond the lower surface of the hull of the vessel and extending along both opposing side walls of the hull of the vessel, so that when the vessel is positioned in the water and passing over the spilled oil, the oil positioned beneath the vessel will continue to pass rearwardly beneath the vessel until reaching the oil/water separation column 6, rather than being forced outwardly away from the vessel by way of the sides of the vessel, the fins preventing or substantially reducing the sideways flow of oil away from the vessel, thereby increasing the amount of oil reaching the oil/water separation column 6 for subsequent separation from the water as described above.

In one embodiment of the present invention, pontoons or catamaran hulls (not shown) may be securely fastened, for example, to both sides of the vessel of the present invention, so as to come into contact with and to be supported by the water upon which the vessel is positioned, to provide buoyancy and stability, the pontoons or catamaran hulls being raisable or lowerable relative to the vessel, to allow the vessel to be raisable or lowerable relative to the water upon which the vessel is positioned, thereby changing the submerged depth of the lower end of the oil/water separation column. In this embodiment of the invention, the pontoons or catamaran hulls are preferably pivotably fastened by means of, for example, attachment pins or other similar pivoting attachment means to each side of the vessel and preferably at or proximate the forward corners of the vessel (it being understood that they could alternatively be positioned anywhere on the side of the vessel, opposite one another), allowing the front of the vessel to be supported by the pontoons or catamaran hulls while the aft end of the vessel floats freely on the water allowing the aft end of the vessel to rise and fall with the waves passing beneath the hull of the vessel. In this embodiment, the front attachment points can be mechanically raised or lowered by the operator of the vessel while the aft end floats freely on the surface of the water. In a further alternative embodiment of the present invention, the pontoons or catamaran hulls are fastened in a non-pivoting manner, for example, by securely fastening both of the ends of the pontoons or catamaran hulls securely to the vessel, the non-pivoting fastening means being adjustable to allow the pontoons or catamaran hulls to be raisable or lowerable relative to the vessel in a known manner.

Figure 4:
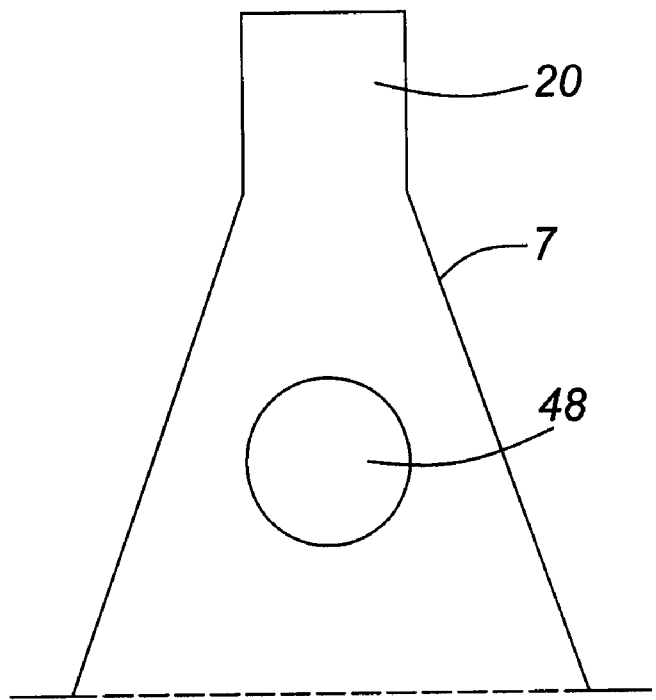
FIG. 4 is a cross-sectional view of a circular passageway through an oil/water separation column of one embodiment of the present invention, various fitments not being illustrated for the sake of clarity.
Figure 5:
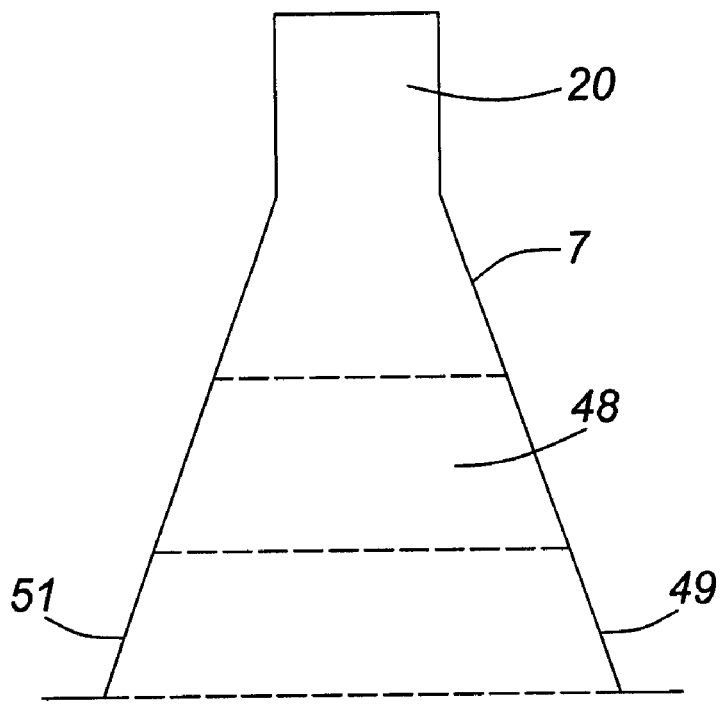
FIG. 5 is a side perspective view of the circular passageway through the oil/water separation column of one embodiment of the present invention illustrated in FIG. 4, various fitments not being illustrated for the sake of clarity.
Figure 6:
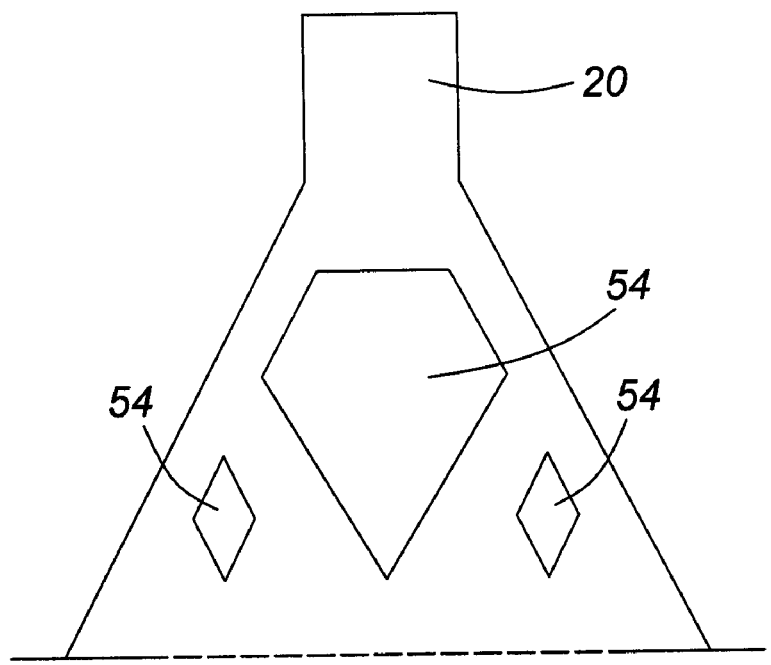
FIG. 6 is a cross-sectional view of diamond shaped passageways through an oil/water separation column of one embodiment of the present invention, various fitments not being illustrated for the sake of clarity.
Figure 7:
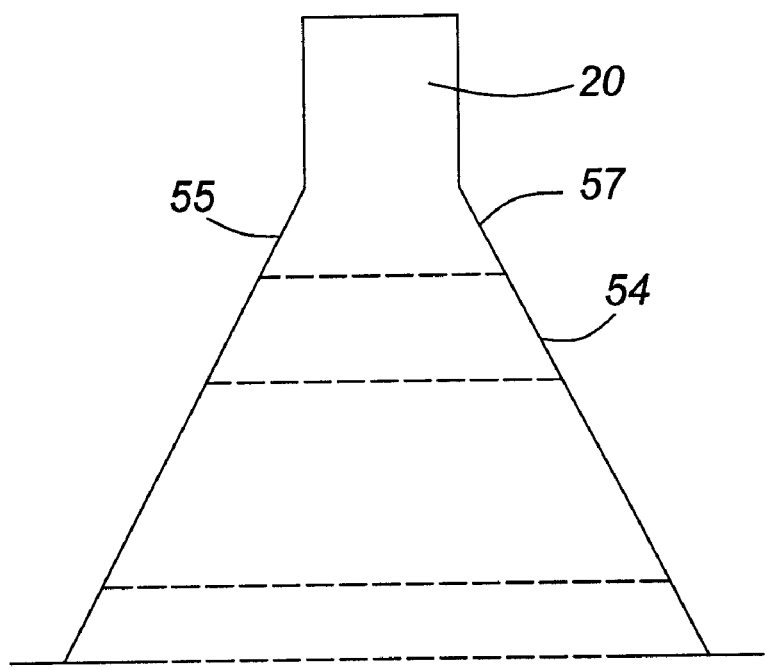
FIG. 7 is a side perspective view of one of the diamond shaped passageways through the oil/water separation column of the embodiment of the present invention illustrated in FIG. 6, various fitments not being illustrated for the sake of clarity.

FIGS. 4, 5 and 6 illustrate alternative embodiments of the oil/water separation column 6 of the present invention in which, as illustrated in FIGS. 4 and 5, a hollow passageway 48 of generally circular cross-section is provided, preferably extending from one side wall 49 of the oil/water separation column to the opposite side wall thereof 51, both ends of the passageway 48 preferably being open so that, in one embodiment of the present invention, heated air or another heating device or mechanism (not shown) may be inserted into the hollow passageway 48 to heat the walls of the passageway 48 and thereby heat the water/oil in the oil/water separation column 6 to thereby decrease the viscosity (and increase the slipperiness) and density of the oil, to thereby aid in the movement of the oil within the oil/water separation column 6 and to increase the separability of the oil from the water within the oil/water separation column 6. Additionally, the air-filled hollow passageway 48 occupies a large volume of space within the oil/water separation column 6, thereby decreasing the overall amount (and weight) of water/oil within the oil/water separation column 6, and accordingly providing a more buoyant and maneuverable vessel, and allowing the vessel to float higher in the water (it being understood that a vessel floating higher in the water allows the oil 4 to slide under the vessel to point 7A with less effort, as the oil requires less effort to overcome the buoyant force acting upon it). The more submerged that 7A is the more effort is needed for the oil to dive down to it. Similarly, as illustrated in FIGS. 6 and 7, one or more diamond shaped hollow passageways 54 are provided preferably extending from one side wall 55 of the oil/water separation column to the opposite side wall thereof 57, both ends of the passageways 54 preferably being openable and closeable so that, in one embodiment of the present invention, heated air or another heating device or mechanism (not shown) may be inserted into the passageways 54 to heat the walls of the passageways 54 (the passageway being closeable to maintain the heat within the passageway, it being understood that a passageway can be configured in a manner known to a person skilled in the art to transfer heat to the outer walls of the passageway for subsequent transfer of the heat to the oil within the oil/water separation column 6) and thereby heat the water/oil in the oil/water separation column 6 to thereby decrease the viscosity (and increase the slipperiness) and density of the oil, to thereby aid in the movement of the oil within the oil/water separation column 6 and to increase the separability of the oil from the water within the oil/water separation column 6.

In one embodiment of the present invention, one or more of the surfaces of the vessel may be heated, by way of, for example, a steam or hot-water filled blanket (not shown), heat tracing lines (not shown) or some other heat source positioned on or directed toward one or more surfaces of the vessel, to increase the slipperiness (decrease the viscosity) of the oil and to thereby increase the ability to collect and separate the oil from the water.

Figure 2:
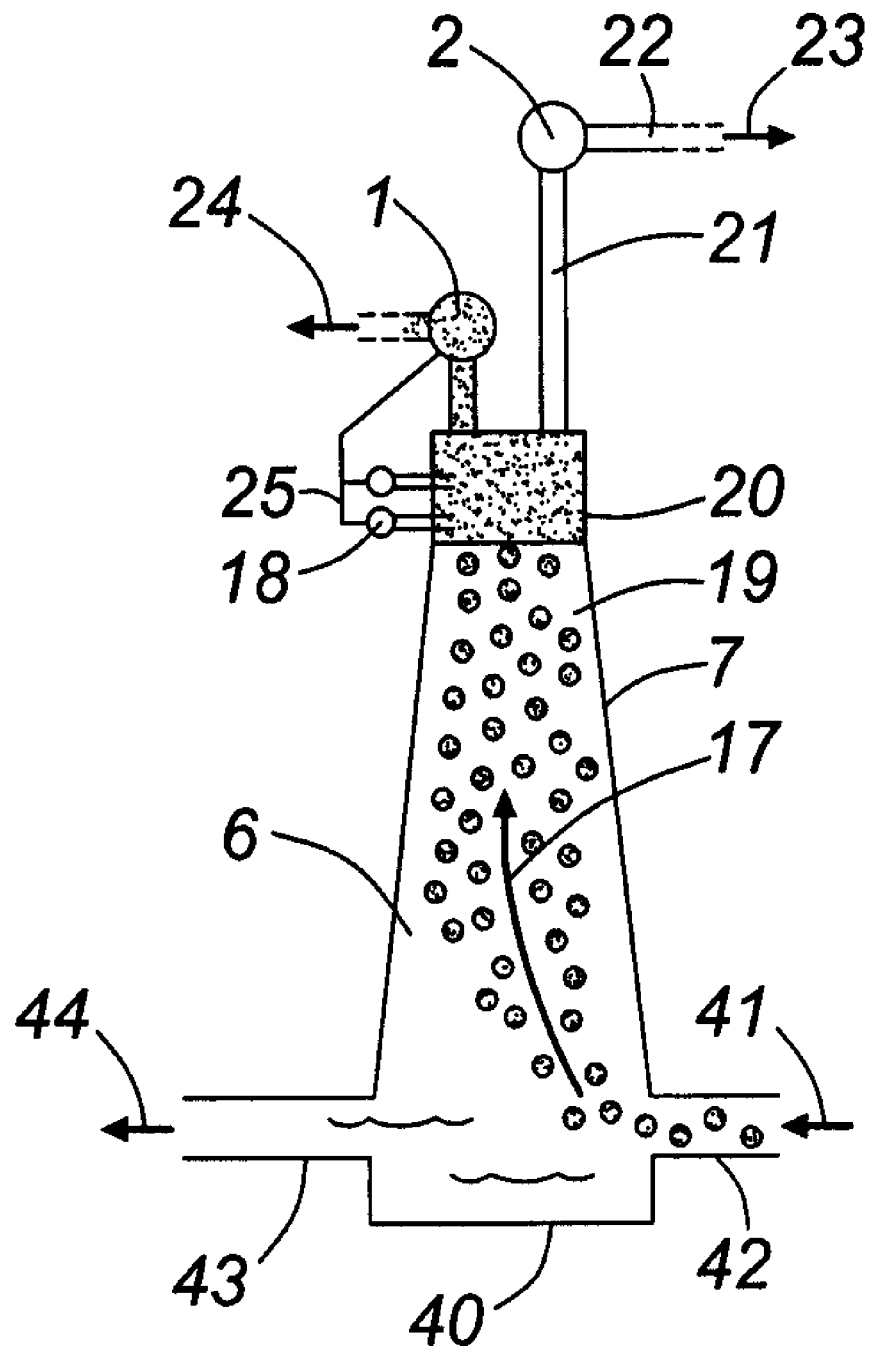
FIG. 2 is a schematic cross-sectional view of another embodiment of the present invention.

As illustrated in FIG. 2, an alternative embodiment of the present invention is provided having an oil/water separation column 6, preferably having a solid water-tight bottom 40, the oil/water separation column 6 having an inlet 42 through which oil/water is preferably pumped or drawn or otherwise enters the oil/water separation column 6 (as illustrated by the arrow 41), the water and oil being drawn into, and preferably to, or proximate the top of the oil/water separation column by means of, for example, a continuously operating high speed blower vacuum pump 2, so that as the oil/water enters the oil/water separation column 6, the oil, being more buoyant than water, will rise to (as illustrated by the arrow 17) and accumulate at or substantially proximate the top of the oil/water separation column, and preferably within an oil accumulation chamber 20, for removal preferably by an oil pump 1, such as, for example, an Archimedes screw type oil pump, or gear pump or other oil pump, to a storage location (as illustrated by the arrow 24). In one embodiment of the present invention, one or more oil sensors 18 are provided on the oil accumulation chamber 20, which one or more oil sensors 18, when activated by the presence of oil in the oil accumulation chamber 20, activate the oil pump 1 so that when there is a volume of separated oil in the oil accumulation chamber 20, the oil pump is activated by the sensor(s) and the separated oil thereafter removed from the oil accumulation chamber 20. Treated water may exit from the oil/water separation column 6 through outlet 43 to a storage location for further treatment (as illustrated by the arrow 44), or if fully treated, returned to the environment.

In one embodiment of the invention, the oil/water may be heated prior to entry in the oil/water separation column to thereby decrease the viscosity and density of the oil, and to increase its slipperiness and to increase the separability of the oil from the water as the oil/water enters the oil/water separation column 6.

In one embodiment of the invention, illustrated in FIGS. 8A to 8D, grating 60, netting 61, or series of spaced rails 62 may be securely positioned across the bottom opening of the oil/water separation column 6 to prevent or reduce the likelihood of the accumulation of ice within the oil/water separation column (the water and oil being able to pass through the openings in the grating, netting, or series of spaced rails, and in one embodiment of the present invention, the grating, netting, or series of spaced rails can be heated so that the oil passing therethrough into the oil/water separation column can be heated (to thereby decrease the viscosity and density of the oil, and to increase its slipperiness). The grating, netting, or series of spaced rails may also be positioned and arranged so as to reduce turbulence within the oil/water separation column 6. In one embodiment of the present invention, a flow deflector (not shown) may be mounted on the surface 11 positioned immediately upstream of the surface 11 so as to direct the flow of water beneath the hull to reduce turbulence within the oil/water separation column 6.

The embodiment of the invention illustrated in FIGS. 1A, 1B, 1C, 1D and 2, may be utilized, for example, to assist in oil spill cleanups, for example, on water, where the oil is more buoyant than water, and in other similar contexts where it is necessary or desirable to separate a more buoyant liquid from another less buoyant liquid.

The present invention may be utilized in other contexts known to persons skilled in the art, for example, to remove or separate a less dense fluid floating on the surface of a more dense fluid, for example, to remove or separate light oil floating on top of heavy oil, and in other such circumstances known to persons skilled in the art.

The present invention has been described herein with regard to preferred embodiments. However, it will be obvious to persons skilled in the art that a number of variations and modifications can be made without departing from the scope of the invention as described herein.

What is claimed is:

1. A device for cleaning up spilled oil from the surface of a body of water, comprising:
    a vessel adapted to float on the body of water and to pass over the oil, wherein the vessel has an inclined bow surface for directing the oil downwardly beneath the vessel;
    an oil/water separation column carried on the vessel having an inner cavity with a lower end forming a bottom opening oriented substantially parallel to the surface of the body of water in fluid communication with the water and spilled oil such that oil directed downwardly beneath the vessel by the bow surface is directed to the bottom opening;
    at least a pump in sealed engagement with an upper end of the oil/water separation column, the at least a pump for drawing water and the spilled oil into the oil/water separation column and for drawing the spilled oil from the oil/water separation column; and,
    an air bubble release passageway disposed between a bow section of the vessel and the bottom opening of the oil/water separation column, the air bubble release passageway for reducing air flowing into the oil/water separation column.

2. A device for cleaning up spilled oil from the surface of a body of water as defined in claim 1 wherein the oil/water separation column is narrowed with increasing height.

3. A device for cleaning up spilled oil from the surface of a body of water as defined in claim 1 wherein a lower end portion of an aft wall of the oil/water separation column comprises a surface inclined towards a downstream direction.

4. A device for cleaning up spilled oil from the surface of a body of water as defined in claim 1 wherein the oil/water separation column comprises at least a hollow passageway disposed therein extending between sidewalls of the oil/water separation column.

5. A device for cleaning up spilled oil from the surface of a body of water as defined in claim 4 wherein the at least a hollow passageway comprises a heating mechanism for heating the spilled oil and water drawn through the bottom opening.

6. A device for cleaning up spilled oil from the surface of a body of water as defined in claim 1 wherein the oil/water separation column comprises one of a grating, netting, and series of spaced rails disposed across the bottom opening.

7. A device for cleaning up spilled oil from the surface of a body of water as defined in claim 6 wherein the oil/water separation column comprises a mechanism for heating the one of a grating, netting, and series of spaced rails.

8. A device for cleaning up spilled oil from the surface of a body of water as defined in claim 6 wherein the one of a grating, netting, and series of spaced rails are positioned and arranged such that turbulence within the oil/water separation column is reduced.

9. A device for cleaning up spilled oil from the surface of a body of water as defined in claim 1 wherein the vessel comprises means for heating the spilled oil prior entering the bottom opening of the oil/water separation column.

10. A device for cleaning up spilled oil from the surface of a body of water as defined in claim 9 wherein the means comprises a heating surface attached to the vessel.

11. A device for cleaning up spilled oil from the surface of a body of water as defined in claim 1 wherein the air bubble release passageway comprises a top opening for releasing the air to the atmosphere.

12. A device for cleaning up spilled oil from the surface of a body of water as defined in claim 11 wherein the air bubble release passageway comprises substantially vertical oriented walls and wherein the top opening substantially corresponds to the bottom opening.

13. A device for cleaning up spilled oil from the surface of a body of water as defined in claim 1 comprising a left hand side fin and a right hand side fin extending downwardly beyond the bow surface such that the bottom openings of the oil/water separation column and the air bubble release passageway are disposed therebetween.

14. A device for cleaning up spilled oil from the surface of a body of water as defined in claim 13 wherein the bottom openings extend from approximately the left hand side fin to approximately the right hand side fin.

15. A device for cleaning up spilled oil from the surface of a body of water as defined in claim 13 wherein the left hand side fin and the right hand side fin extend downwardly beyond a bottom surface of a stern section of the vessel.

16. A device for cleaning up spilled oil from the surface of a body of water as defined in claim 1 comprising an air pump for drawing water and the spilled oil into the oil/water separation column and an oil pump for drawing the spilled oil from the oil/water separation column, wherein the air pump and the oil pump are independently operable.

17. A device for cleaning up spilled oil from the surface of a body of water as defined in claim 16 wherein the oil/water separation column comprises at least an oil sensor connected to the oil pump for sensing a presence of oil in an upper portion of the oil/water separation column and for activating and deactivating the oil pump in the presence and absence of oil, respectively.

* * * * *